US011277532B2

(12) United States Patent
Ohtake et al.

(10) Patent No.: US 11,277,532 B2
(45) Date of Patent: Mar. 15, 2022

(54) INFORMATION PROCESSING APPARATUS AND NON-TRANSITORY COMPUTER READABLE MEDIUM

(71) Applicant: FUJIFILM BUSINESS INNOVATION CORP., Tokyo (JP)

(72) Inventors: Yu Ohtake, Kanagawa (JP); Ryoji Matsumura, Kanagawa (JP); Hajime Kajiyama, Kanagawa (JP); Kazumoto Shinoda, Kanagawa (JP); Hiromi Ichiba, Kanagawa (JP); Taku Yoshimura, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 16/830,890

(22) Filed: Mar. 26, 2020

(65) Prior Publication Data
US 2021/0075926 A1 Mar. 11, 2021

(30) Foreign Application Priority Data

Sep. 10, 2019 (JP) .............................. JP2019-164337

(51) Int. Cl.
*H04N 1/00* (2006.01)
*H04N 1/44* (2006.01)
*G06F 3/14* (2006.01)

(52) U.S. Cl.
CPC ..... *H04N 1/00514* (2013.01); *H04N 1/00411* (2013.01); *H04N 1/4433* (2013.01)

(58) Field of Classification Search
None
See application file for complete search history.

(56) References Cited

U.S. PATENT DOCUMENTS

| 7,827,277 | B2 | 11/2010 | Kawai | |
|---|---|---|---|---|
| 2005/0002057 | A1* | 1/2005 | Oe | G03G 15/5091 358/1.15 |
| 2005/0231760 | A1* | 10/2005 | Minato | H04N 1/00416 358/1.15 |
| 2006/0002256 | A1* | 1/2006 | Kamio | H04N 5/765 369/47.1 |
| 2006/0067722 | A1* | 3/2006 | Toyoda | G03G 15/5016 399/80 |
| 2009/0180138 | A1* | 7/2009 | Fukuda | H04N 1/00973 358/1.15 |
| 2011/0320963 | A1* | 12/2011 | Wong | H04N 21/631 715/755 |
| 2012/0296448 | A1* | 11/2012 | Balentine | G05B 19/409 700/19 |

(Continued)

FOREIGN PATENT DOCUMENTS

| JP | 4858271 B2 | 1/2012 |
|---|---|---|
| JP | 5434174 B2 | 3/2014 |
| JP | 5896768 B2 | 3/2016 |

*Primary Examiner* — Beniyam Menberu
(74) *Attorney, Agent, or Firm* — Oliff PLC

(57) ABSTRACT

An information processing apparatus includes a memory; and a processor configured to cause information indicating that a first user who has an authority to operate an apparatus is prohibited from operating the apparatus to be displayed on an operation screen of the first user in a case where the first user has commissioned a second user to operate the apparatus but attempts to operate the apparatus by himself or herself.

9 Claims, 14 Drawing Sheets

(56) References Cited

U.S. PATENT DOCUMENTS

| | | | |
|---|---|---|---|
| 2015/0181065 A1* | 6/2015 | Aizono | G06Q 20/40 358/1.14 |
| 2016/0196130 A1* | 7/2016 | Shimizu | G06F 8/65 717/168 |
| 2016/0219054 A1* | 7/2016 | Nagata | G06F 21/84 |

* cited by examiner

FIG. 4

| APPARATUS ID | CUSTOMER TENANT ID | COMMISSIONED TENANT ID |
|---|---|---|
| 10001 | A00001 | |
| 10002 | | B00001 |
| 10003 | A00002 | B00002 |

FIG. 5

| APPARATUS ID | OPERATION TYPE | PRIORITY |
|---|---|---|
| 10001 | REMOTE RESTORATION | COMMISSIONED OPERATOR |
| 10001 | LOCAL RESTORATION | COMMISSIONED OPERATOR |
| 10001 | RESERVED RESTORATION | COMMISSIONED OPERATOR |
| 10002 | REMOTE RESTORATION | CUSTOMER USER |
| 10002 | LOCAL RESTORATION | CUSTOMER USER |
| 10002 | RESERVED RESTORATION | CUSTOMER USER |
| 10003 | REMOTE RESTORATION | COMMISSIONED OPERATOR |
| 10003 | LOCAL RESTORATION | COMMISSIONED OPERATOR |
| 10003 | RESERVED RESTORATION | COMMISSIONED OPERATOR |

FIG. 6

| APPARATUS ID | TENANT ID | BACKUP DATA ID |
|---|---|---|
| 10003 | A00002 | D00001 |
| 10003 | A00002 | D00002 |
| 10003 | B00002 | D00003 |
| 10003 | B00002 | D00004 |
| 10001 | A00001 | D00005 |
| 10002 | B00002 | D00006 |

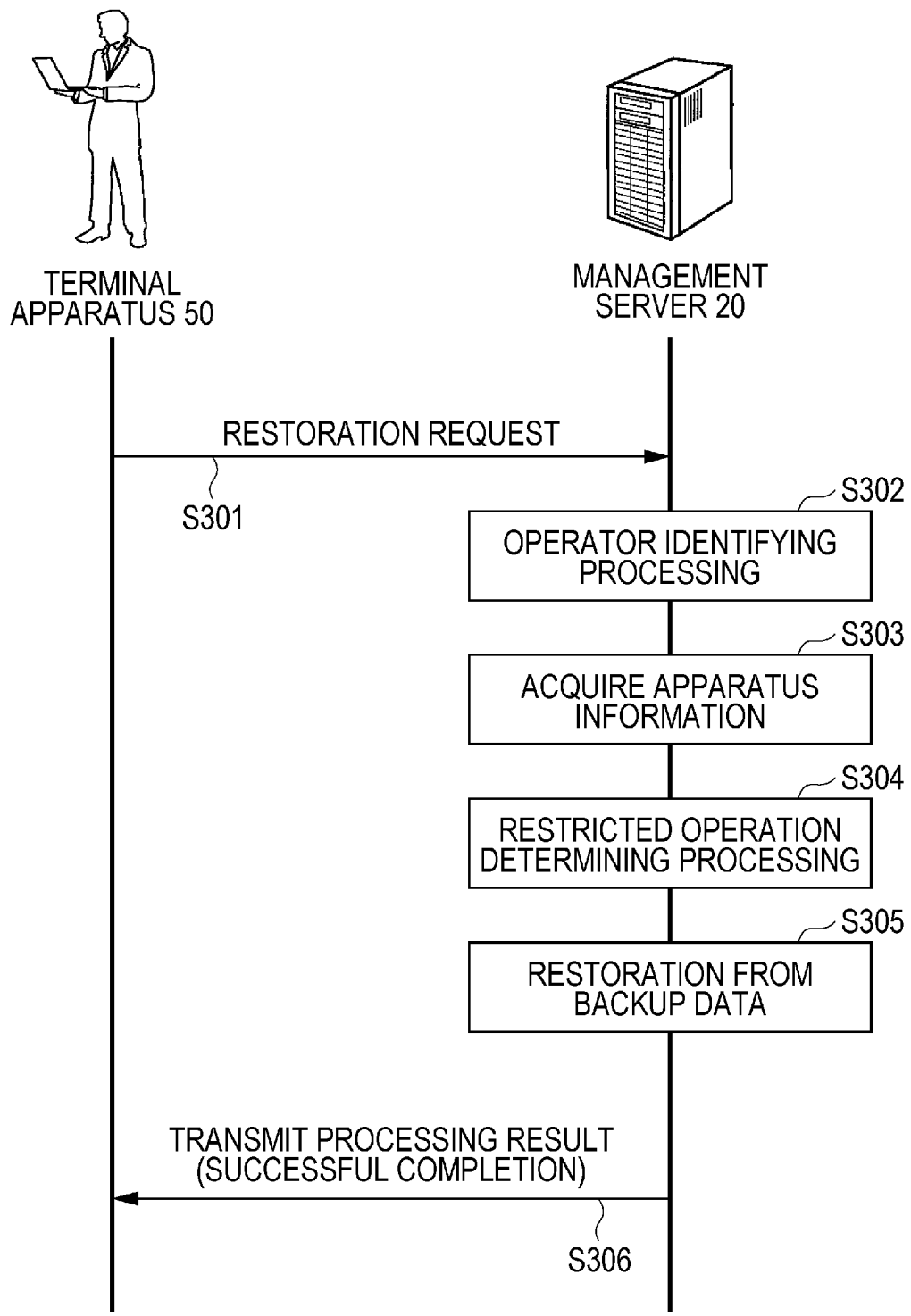

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2019-164337 filed Sep. 10, 2019.

BACKGROUND

(i) Technical Field

The present disclosure relates to an information processing apparatus and a non-transitory computer readable medium.

(ii) Related Art

Japanese Patent No. 4858271 discloses a network system including a device management apparatus that manages at least one device over a network and a device managed by the device management apparatus. According to this network system, a workload of a user who sets an operating condition on a device connected to the network is lessened.

Japanese Patent No. 5434174 discloses a device management system in which new setting information on a new application installed in a multifunction printer can be managed in a device management apparatus or a central management apparatus.

Japanese Patent No. 5896768 discloses an image forming apparatus that can properly operate according to a state of user' use even from an initial stage of use of the image forming apparatus by determining settings of items that are also included in setting information of another image forming apparatus on the basis of the setting information acquired from the other image forming apparatus and determining settings of the other items by using operation history information indicative of a history of operations including printing and copying executed in the other image forming apparatus.

SUMMARY

Aspects of non-limiting embodiments of the present disclosure relate to an information processing apparatus and a non-transitory computer readable medium that can prevent operations of plural users from interfering with each other in a case where a user who has an authority to operate an apparatus commissions another user to operate the apparatus.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a memory; and a processor configured to cause information indicating that a first user who has an authority to operate an apparatus is prohibited from operating the apparatus to be displayed on an operation screen of the first user in a case where the first user has commissioned a second user to operate the apparatus but attempts to operate the apparatus by himself or herself.

BRIEF DESCRIPTION OF THE DRAWINGS

An exemplary embodiment of the present disclosure will be described in detail based on the following figures, wherein:

FIG. 4 illustrates an example of an apparatus information management table stored in an apparatus information management table storage unit;

FIG. 5 illustrates an example of a restricted operation information management table stored in a restricted operation information management table storage unit;

FIG. 6 illustrates an example of a backup data management table stored in a backup data management table storage unit;

FIG. 15 is a sequence chart for explaining a case where a restoration request to the management server is successfully accepted.

DETAILED DESCRIPTION

An exemplary embodiment of the present disclosure is described in detail below with reference to the drawings.

Figure 1:
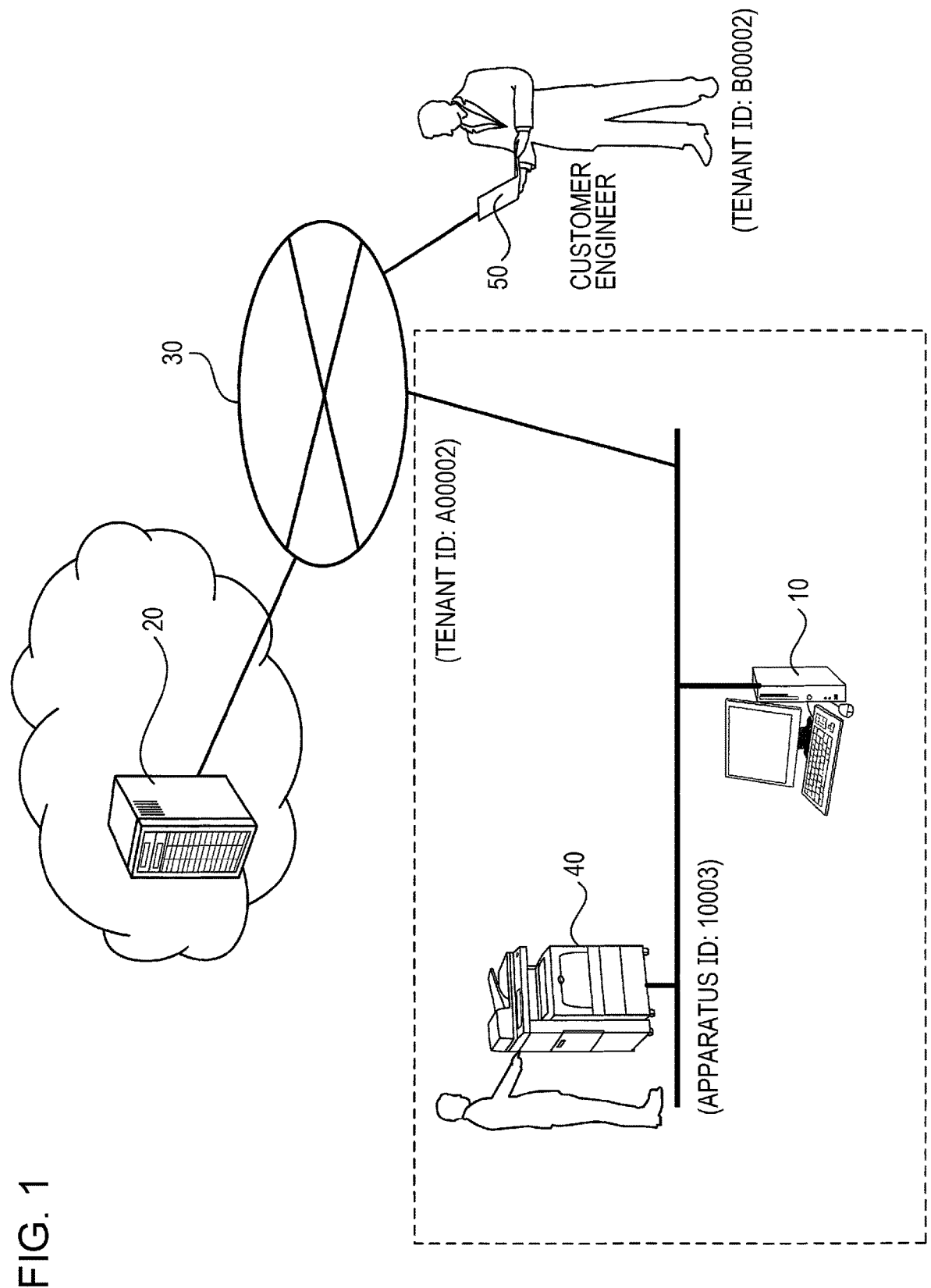
FIG. 1 illustrates a configuration of an information processing system according to an exemplary embodiment of the present disclosure.

FIG. 1 is a system diagram illustrating a configuration of an information processing system according to an exemplary embodiment of the present disclosure.

As illustrated in FIG. 1, the information processing system according to the exemplary embodiment of the present disclosure includes an image forming apparatus 40, a terminal apparatus 10, and a management server 20 that are connected to one another over the Internet 30.

The image forming apparatus 40 is a multifunction printer having plural functions such as a print function, a scan function, a copy function, and a facsimile function.

The management server 20 is an information processing apparatus that offers a cloud service such as backup of setting information and restoration of requested setting information from backup. Specifically, the management server 20 receives setting information uploaded from the image forming apparatus 40 and stores therein the setting information as backup data. Although only a single image forming apparatus 40 is illustrated in FIG. 1 for simplification, the management server 20 stores therein setting information uploaded from a large number of image forming apparatuses as backup data.

By thus storing the setting information of the image forming apparatus 40 as backup data in the management server 20, it is possible to restore setting information that was deleted by mistake in any of the apparatuses, to continuously use previous settings in a case where one apparatus is replaced with another apparatus, and to apply the same settings as those of an existing apparatus to a new apparatus. Hereinafter, such setting processes using the stored setting information are referred to as restoration.

Examples of the setting information include scan resolution, various settings (e.g., a color mode) concerning copying, values of the settings, and destination table information used for FAX transmission.

In the terminal apparatus 10, backup management software for backing up and restoring setting information of an image forming apparatus is installed. The backup management software allows the terminal apparatus 10 to perform processing for backing up setting information of the image forming apparatus 40 by acquiring the setting information and transmitting the setting information to the management server 20 and processing for restoring setting information of the image forming apparatus 40 by acquiring the setting information backed up in the management server 20.

An operation for backing up setting information of the image forming apparatus 40 is typically performed by a machine administrator of a customer user who possesses the image forming apparatus 40. However, for example, in a case where the customer user possesses a large number of image forming apparatuses or in a case where the machine administrator is unfamiliar with an operation of the image forming apparatus 40, the machine administrator may commission a customer engineer (hereinafter abbreviated as a CE), who is maintenance staff of a manufacturer of the image forming apparatus 40, to perform such a backup operation or a restoration operation.

FIG. 1 illustrates how a CE creates backup of data of the image forming apparatus 40 and restoring the data from the created backup data by using the terminal apparatus 50.

The management server 20 employs a multi-tenant system, that is, is used by plural authenticated users. The customer user who possesses the image forming apparatus 40 is registered as a tenant of a tenant ID "A00002". The CE commissioned to perform an operation by using the terminal apparatus 50 is registered as a tenant of a tenant ID "B00002". The image forming apparatus 40 is registered as an apparatus of an apparatus ID "10003".

The customer user who possesses the image forming apparatus 40 has an authority to operate the image forming apparatus 40, and if the customer user has commissioned the CE to restore data from backup data but forgets that the customer user has commissioned the CE to restore data and performs a restoration operation on an operation panel of the image forming apparatus 40 or by using the backup management software of the terminal apparatus 10, operations of plural users interfere with each other in the image forming apparatus 40. In such a case where operations of plural users interfere with each other, there is a risk of occurrence of a trouble such as unsuccessful restoration from backup data.

In view of this, the management server 20 according to the present exemplary embodiment performs the following processing so that operations of plural user are prevented from interfering with each other even in a case where a user who has an authority to operate an apparatus commissions another user to operate the apparatus.

Figure 2:
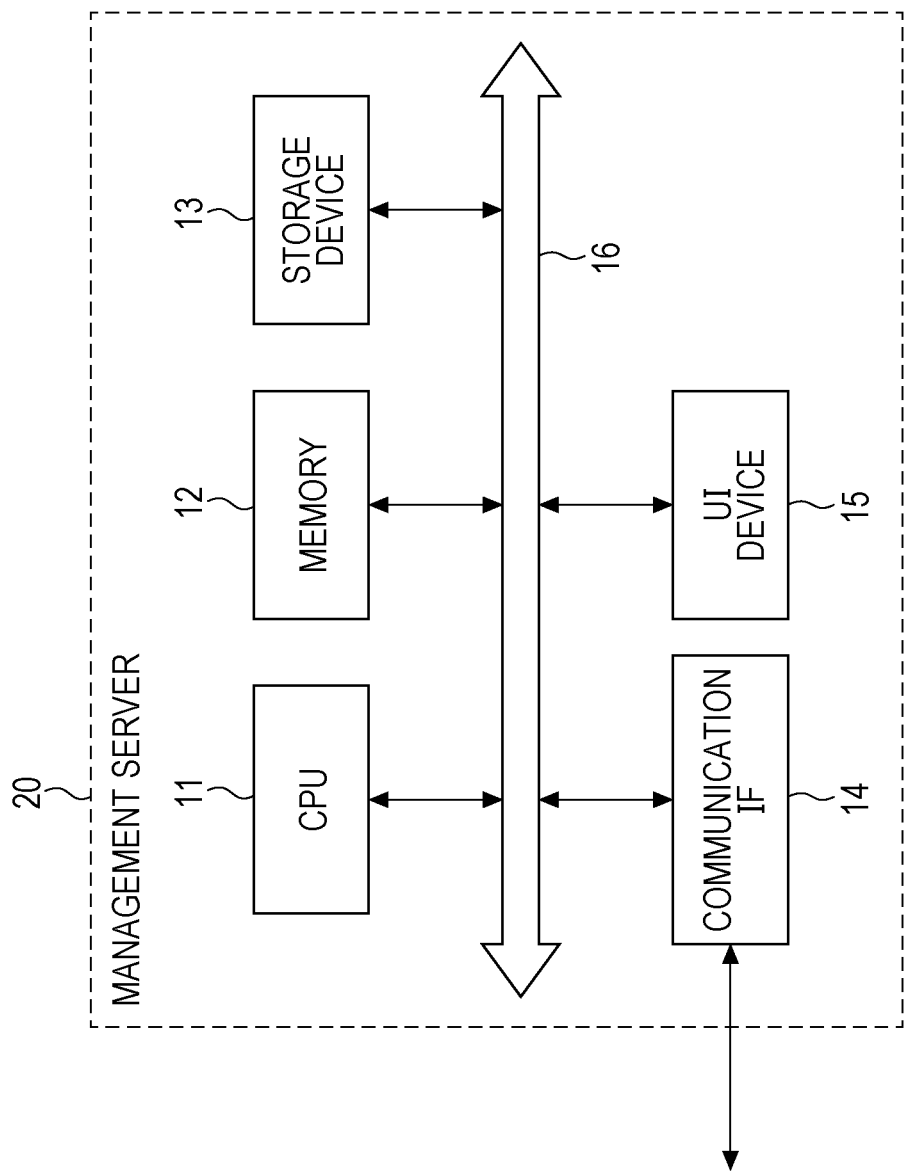
FIG. 2 is a block diagram illustrating a hardware configuration of a management server according to the exemplary embodiment of the present disclosure.

FIG. 2 illustrates a hardware configuration of the management server 20 in the information processing system according to the present exemplary embodiment.

As illustrated in FIG. 2, the management server 20 has a CPU 11, a memory 12, a storage device 13 such as a hard disk drive, a communication interface (abbreviated as IF) 14 that transmits and receives data to and from an external apparatus or the like over the Internet 30, and a user interface (abbreviated as UI) device 15 including a touch panel or a liquid crystal display and a keyboard. These constituent elements are connected to one another via a control bus 16.

The CPU 11 controls operation of the management server 20 by executing predetermined processing in accordance with a control program stored in the memory 12 or the storage device 13. Although the CPU 11 reads out and executes the control program stored in the memory 12 or the storage device 13 in the present exemplary embodiment, the program stored in a storage medium such as a CD-ROM may be offered to the CPU 11.

Figure 3:
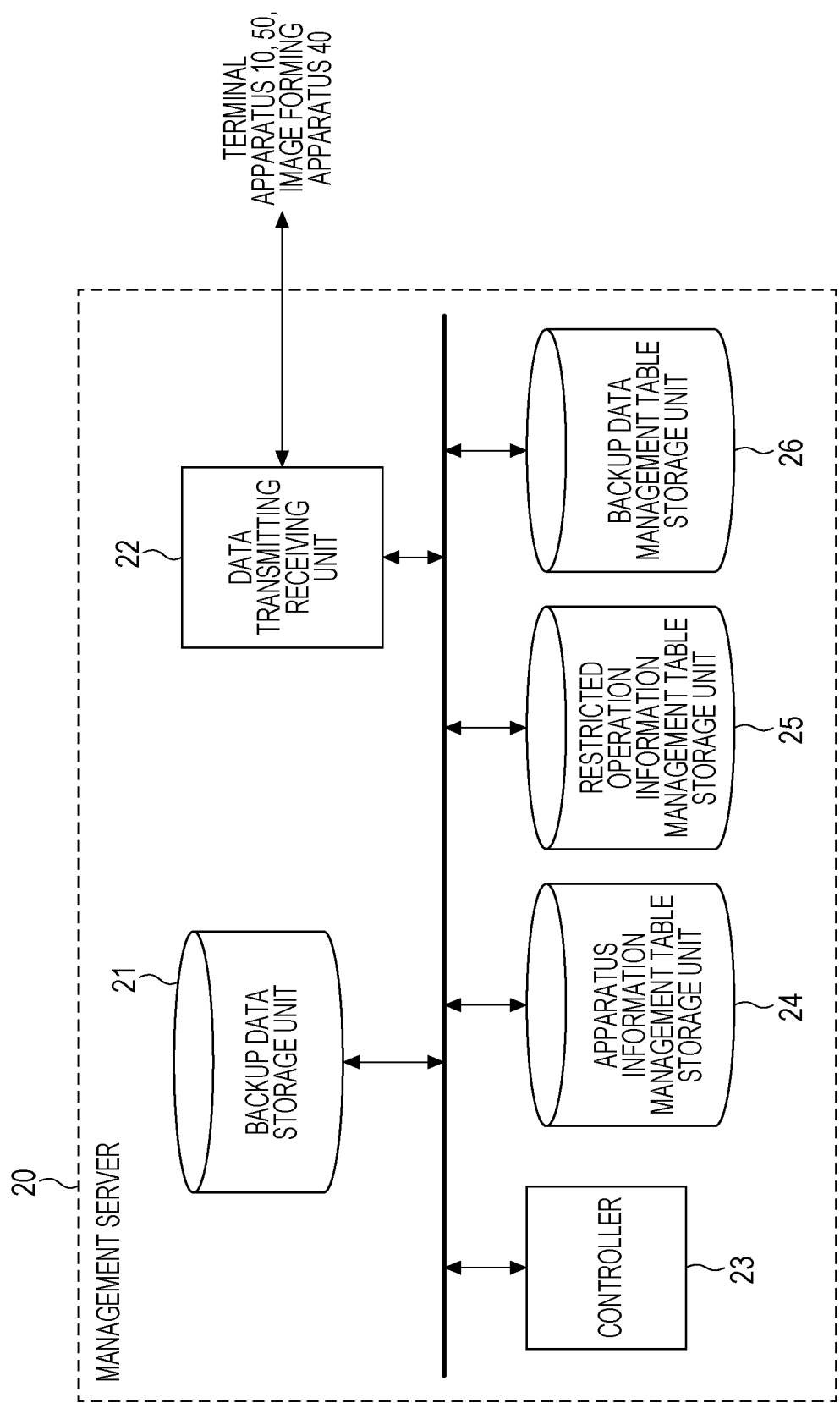
FIG. 3 is a block diagram illustrating a functional configuration of the management server according to the exemplary embodiment of the present disclosure.

FIG. 3 is a block diagram illustrating a functional configuration of the management server 20 realized by execution of the control program.

As illustrated in FIG. 3, the management server 20 according to the present exemplary embodiment includes a backup data storage unit 21, a data transmitting receiving unit 22, a controller 23, an apparatus information management table storage unit 24, a restricted operation information management table storage unit 25, and a backup data management table storage unit 26.

The backup data storage unit 21 stores therein various kinds of setting information of apparatuses such as the image forming apparatus 40 as backup data. In the backup data storage unit 21, not a single piece of backup data but plural pieces of backup data are stored in association with a single apparatus so that pieces of backup data registered by one user are distinguishable from ones registered by another user and pieces of backup data registered on one date are distinguishable from ones registered on another date.

The data transmitting receiving unit 22 transmits and receives data to and from apparatuses such as the image forming apparatus 40 and the terminal apparatuses 10 and 50 over the Internet 30. Specifically, the data transmitting receiving unit 22 receives backup data uploaded from the image forming apparatus 40 and the terminal apparatuses 10 and 50 and downloads stored backup data into the image forming apparatus 40 and the terminal apparatuses 10 and 50.

The controller 23 controls operation of the whole management server 20 and performs processing for storing, in the backup data storage unit 21, backup data received from the image forming apparatus 40 and the terminal apparatuses 10 and 50 by the data transmitting receiving unit 22 and processing for transmitting backup data stored in the backup data storage unit 21 to the image forming apparatus 40 and the terminal apparatuses 10 and 50 via the data transmitting receiving unit 22.

The apparatus information management table storage unit 24 stores therein an apparatus information management table in which information on an operator and a commissioned operator is registered for each apparatus. FIG. 4 illustrates an example of the apparatus information management table stored in the apparatus information management table storage unit 24.

In the apparatus information management table illustrated in FIG. 4, an apparatus ID for identifying an apparatus, a customer tenant ID for identifying an operator, and a commissioned tenant ID for identifying a commissioned operator are stored in association with one another.

For example, in the apparatus information management table illustrated in FIG. 4, a customer user given a customer tenant ID "A00001" is registered as an operator of an apparatus given an apparatus ID "10001".

In the apparatus information management table illustrated in FIG. 4, a customer user given a customer tenant ID "A00002" is registered as an operator of the image forming apparatus 40 given an apparatus ID "10003" illustrated in FIG. 1 and a CE given a commissioned tenant ID "B00002" is registered as a commissioned operator of the image forming apparatus 40 given the apparatus ID "10003" illustrated in FIG. 1.

The restricted operation information management table storage unit 25 stores therein a restricted operation information management table for setting, for each operation type of each apparatus, which of an operation of a commissioned operator and an operation of a customer user is given a priority. FIG. 5 illustrates an example of the restricted operation information management table stored in the restricted operation information management table storage unit 25.

In the restricted operation information management table illustrated in FIG. 5, which of a commissioned operator and a customer user is given a priority is set for each combination of apparatus ID and operation type. The priority is a right to perform an operation in preference to other users in a case where operation of plural users interfere with each other. An operation of a user who is not given a priority is restricted.

In a case where a customer user has commissioned another user such as a CE to operate an apparatus, an operation of the commissioned operator may be always given a priority without setting which of the commissioned operator and the customer user is given a priority because it is typical to give a priority to an operation of the commissioned operator in such a case.

As for the image forming apparatus 40 given the apparatus ID "10003" illustrated in FIG. 1, an operation of a commissioned operator is given a priority in all operation types.

The "REMOTE RESTORATION" in FIG. 5 means restoration of data of the image forming apparatus 40 from backup data based on an operation performed on the terminal apparatus 10 or 50. The "LOCAL RESTORATION" in FIG. 5 means data restoration from backup data based on an operation directly performed an operation panel of the image forming apparatus 40. The "RESERVED RESTORATION" in FIG. 5 means restoration automatically performed at a time appointed in advance.

The backup data management table storage unit 26 stores therein a backup data management table for managing backup data stored in the backup data storage unit 21. FIG. 6 illustrates an example of the backup data management table stored in the backup data management table storage unit 26.

In the backup data management table illustrated in FIG. 6, a backup ID for identifying uploaded backup data is stored in association with a combination of apparatus ID and tenant ID for identifying a user who performed an operation of storing the backup data.

As is clear from the backup data management table illustrated in FIG. 6, plural pieces of backup data are stored for a single apparatus.

The controller 23 causes information indicating that a customer user is prohibited from operating an apparatus which the customer user is authorized to operate to be displayed on an operation screen of the customer user in a case where the customer user attempts to operate the apparatus by himself or herself although the customer user has commissioned another user such as a CE to operate the apparatus.

The present exemplary embodiment discusses a case where the operated apparatus is the image forming apparatus 40. Accordingly, the controller 23 causes information indicating that a customer user is prohibited from operating the image forming apparatus 40 which the customer user is authorized to operate to be displayed on an operation screen of the customer user in a case where the customer user attempts to operate the image forming apparatus 40 by himself or herself although the customer user has commissioned another user such as a CE to operate the image forming apparatus 40.

The "commission" means that a user who has an authority to operate an apparatus asks another user who has no authority to operate the apparatus to operate the apparatus. Note that it is regarded that a user has commissioned another user when the commissioned operator issues a request number upon receipt of a request for commission or when a commissioned CE registers his or her tenant ID in the apparatus information management table.

Furthermore, the controller 23 causes information indicating that the customer user is prohibited from operating the image forming apparatus 40 since the CE, who is a commissioned operator, has been commissioned to operate the image forming apparatus 40 to be displayed on the operation screen of the customer user in a case where the customer user attempts to operate the image forming apparatus 40.

The controller 23 refers to the apparatus information management table stored in the apparatus information management table storage unit 24 to determine whether or not the customer user has commissioned another user such as a CE to operate the image forming apparatus 40.

Specifically, the controller 23 causes information indicating that the customer user is prohibited from operating the image forming apparatus 40 to be displayed on the operation screen of the customer user in a case where information on an operator, that is, a commissioned tenant ID is registered in association with the image forming apparatus 40 which the customer user has attempted to operate.

That is, in this case, the controller 23 determines whether or not the customer user has commissioned another user such as a CE to operate the image forming apparatus 40 not based on whether or not an CE, who is a commissioned operator, is actually operating the image forming apparatus 40, but based on whether information on a commissioned operator is registered in association with the image forming apparatus 40.

When a commissioned operator completes a requested operation such as data restoration from backup data, his or her commissioned tenant ID is deleted from the apparatus information management table. Accordingly, even in the case where whether to restrict an operation of a customer user is determined based on whether a commissioned operator is registered or not, a period during which an operation of the customer user is restricted does not become too long.

The controller 23 may cause information indicating that the customer user is prohibited from operating the image forming apparatus 40 since the CE, who is a commissioned operator, is operating the image forming apparatus 40 to be displayed on the operation screen of the customer user in a case where the customer user attempts to operate the image forming apparatus 40.

Furthermore, the controller 23 may cause information indicating that the customer user is prohibited from operating the image forming apparatus 40 since the commissioned operator is operating the image forming apparatus 40 to be displayed in a case where there is a history of an operation of the commissioned operator within a preset period (e.g., 5 minutes) from the attempt of the customer user to operate the image forming apparatus 40 by referring to operation log information (or operation history information) of the image forming apparatus 40 instead of restricting an operation of the customer user based on only whether the commissioned operator is registered in the apparatus information management table.

Overlapping operations of plural users causes a problem especially in a case where the users attempt to store some sort of data into the image forming apparatus 40. Specifically, in a case where plural users attempt to restore data of the image forming apparatus 40 from external backup data, the overlapping restoration operations of these users are highly likely to cause a trouble.

In view of this, the controller 23 causes information indicating that the customer user is prohibited from operating the image forming apparatus 40 to be displayed on the operation screen of the customer user in a case where the customer user attempts to store data into the image forming apparatus 40, for example, in a case where the customer user attempts to restore setting information of the image forming apparatus 40 from external setting information (e.g., backup data).

Next, operation of the management server 20 according to the present exemplary embodiment is described in detail below with reference to the drawings.

Figure 7:
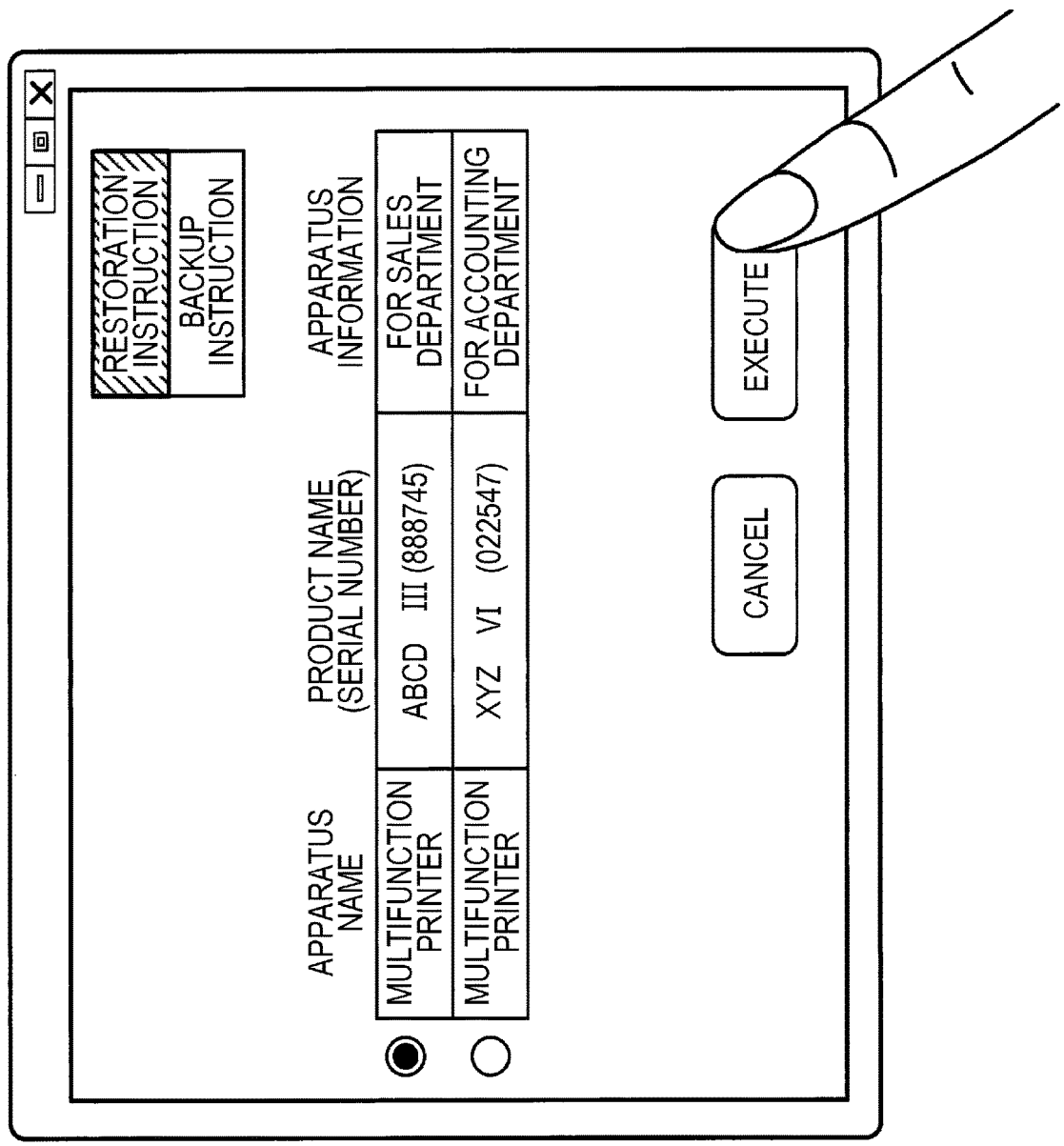
FIG. 7 illustrates an example of a display screen for selection of an apparatus to be restored on an operation panel of an image forming apparatus or on a terminal apparatus.

FIG. 7 illustrates an example of a display screen for selection of an apparatus to be restored on the operation panel of the image forming apparatus 40 or on the terminal apparatus 10.

FIG. 7 illustrates a case where an apparatus whose product name is "ABCD III (888745)" is selected as an apparatus to be restored.

Figure 8:
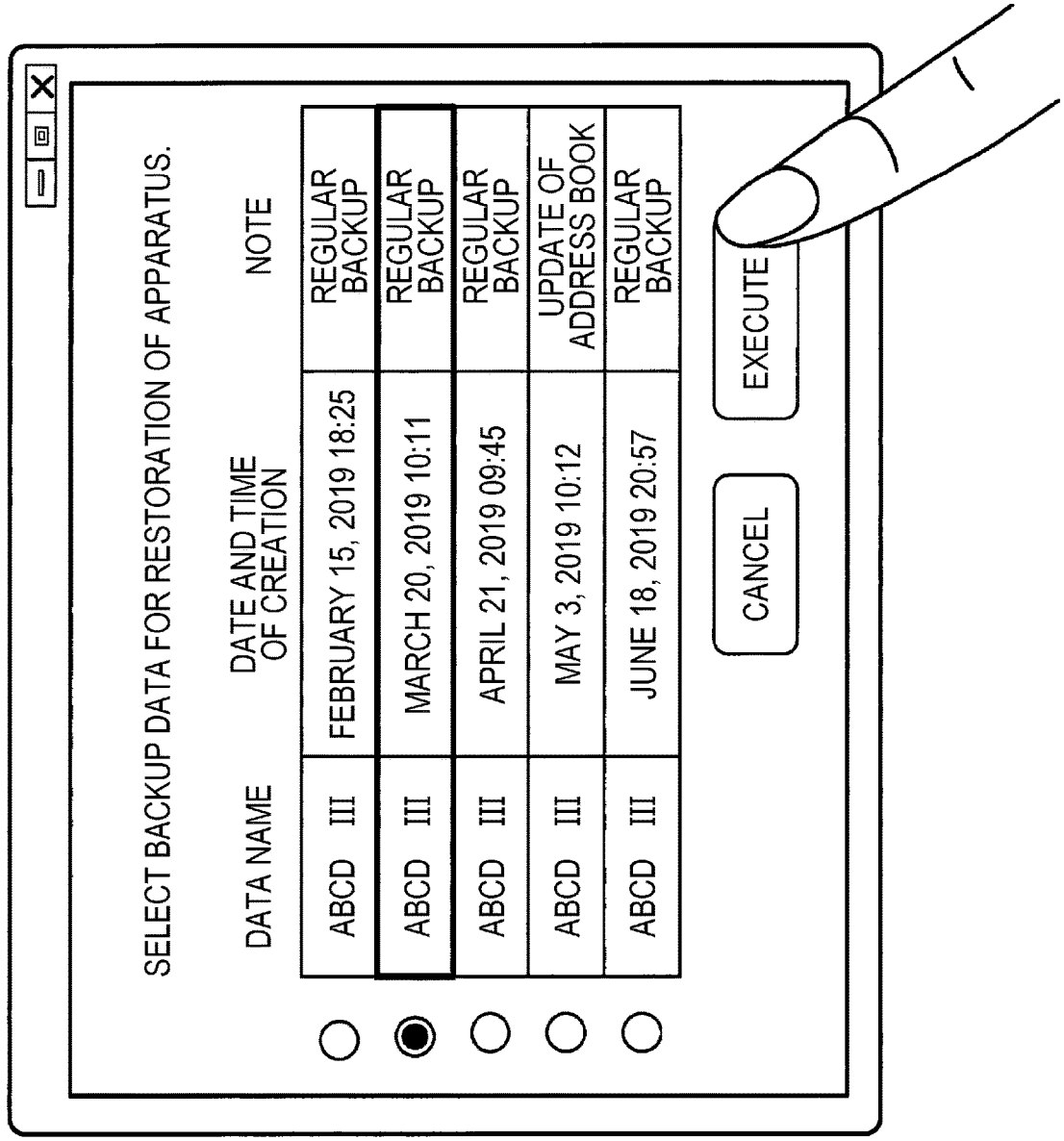
FIG. 8 illustrates an example of an operation screen for selection of backup data for restoration of data of the image forming apparatus.

FIG. 8 illustrates an example of an operation screen on which backup data from which data of the image forming apparatus 40 is to be restored is selected from among backup data stored in the management server 20 on the operation panel of the image forming apparatus 40 or on the terminal apparatus 10.

FIG. 8 shows that restoration is executed by selecting a single piece of backup data from among plural pieces of backup data stored in the management server 20 while referring to a data name, date and time of creation, a note, and the like.

Figure 9:
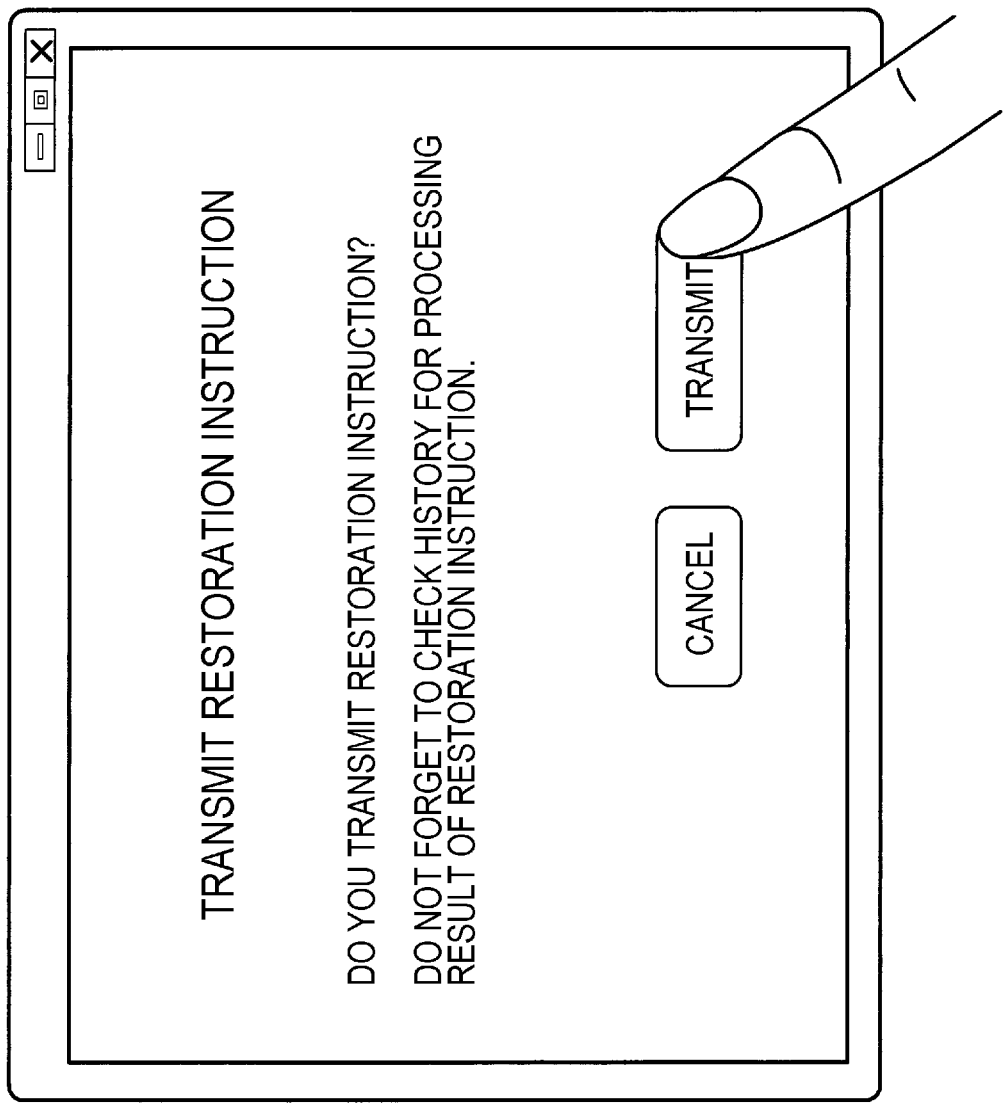
FIG. 9 illustrates an example of a screen for final confirmation of a restoration instruction displayed after selection of backup data for restoration.

FIG. 9 illustrates an example of a screen for final confirmation of a restoration instruction displayed in a case where backup data has been selected on the operation screen illustrated in FIG. 8.

FIG. 9 illustrates an example of an operation screen for user's final confirmation of a restoration instruction. When the user operates a transmission button after referring to this operation screen, restoration processing starts.

Figure 10:
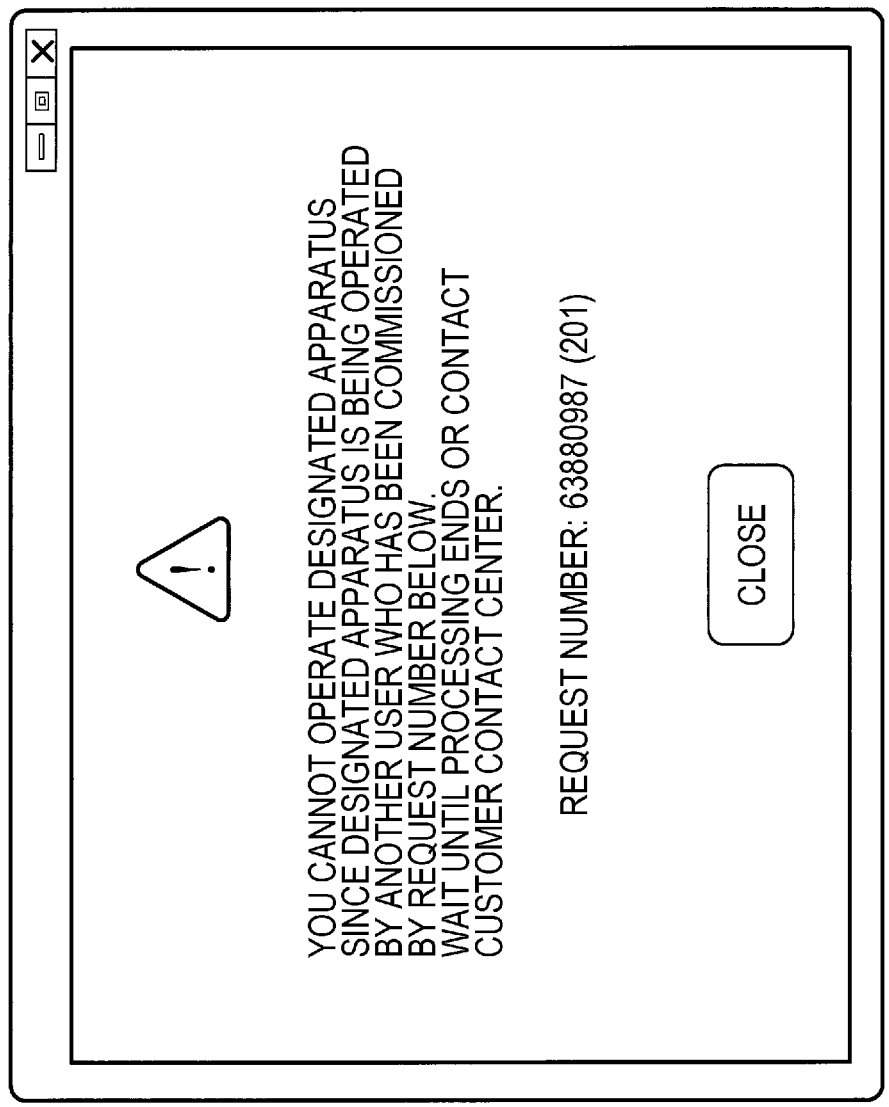
FIG. 10 illustrates an example of an error screen displayed in a case where a customer user has started restoration processing but the restoration processing is not executed because of the presence of a registered commissioned operator.

FIG. 10 illustrates an example of an error screen displayed in a case where a customer user has started restoration processing but the restoration processing is not executed because of presence of a registered commissioned operator.

In FIG. 10, a message "YOU CANNOT OPERATE DESIGNATED APPARATUS SINCE DESIGNATED APPARATUS IS BEING OPERATED BY ANOTHER USER WHO HAS BEEN COMMISSIONED BY REQUEST NUMBER BELOW" notifying the customer user about failure to execute the restoration processing and a reason for the failure is displayed.

Figure 11:
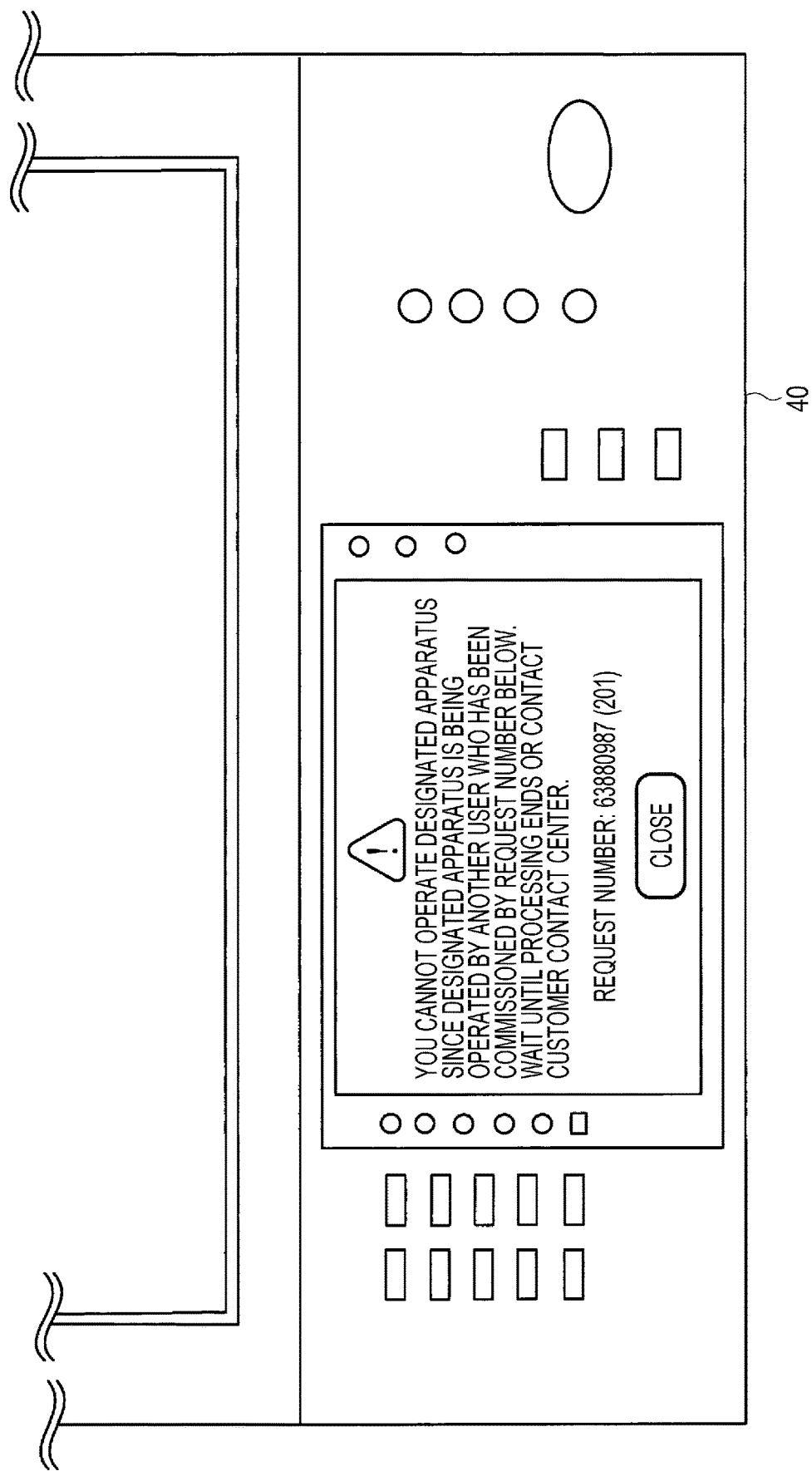
FIG. 11 is a view for explaining an example of a case where the error screen illustrated in FIG. 10 is displayed on the operation panel of the image forming apparatus.

Note that the error screen illustrated in FIG. 10 is displayed on the operation panel of the image forming apparatus 40 as illustrated in FIG. 11 in a case where the customer user gives the restoration instruction on the operation panel of the image forming apparatus 40.

Figure 12:
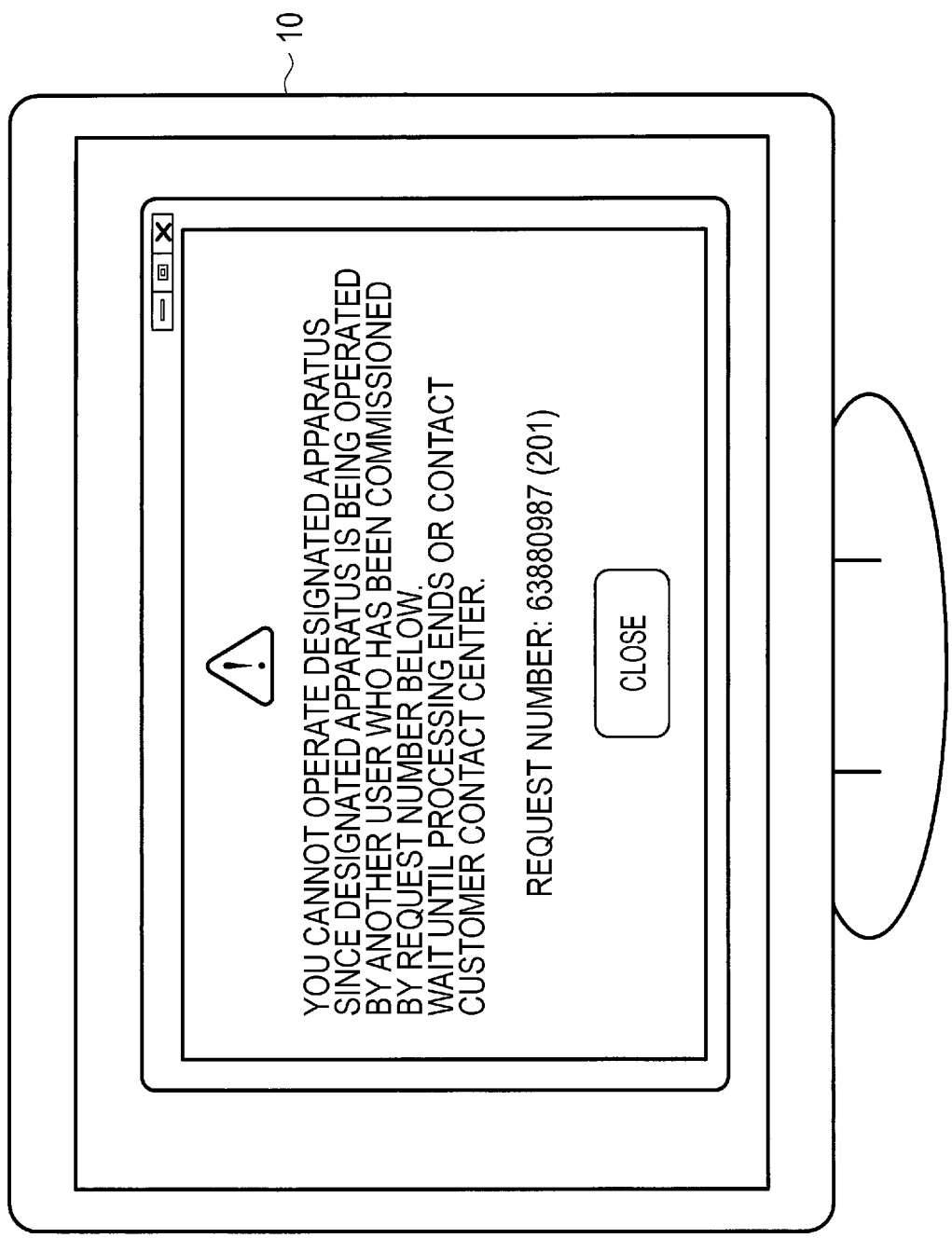
FIG. 12 is a view for explaining an example of a case where the error screen illustrated in FIG. 10 is displayed on a display of the terminal apparatus 10.

Meanwhile, the error screen illustrated in FIG. 10 is displayed on the display of the terminal apparatus 10 as illustrated in FIG. 12 in a case where the customer user gives the restoration instruction by using the terminal apparatus 10.

Figure 13:
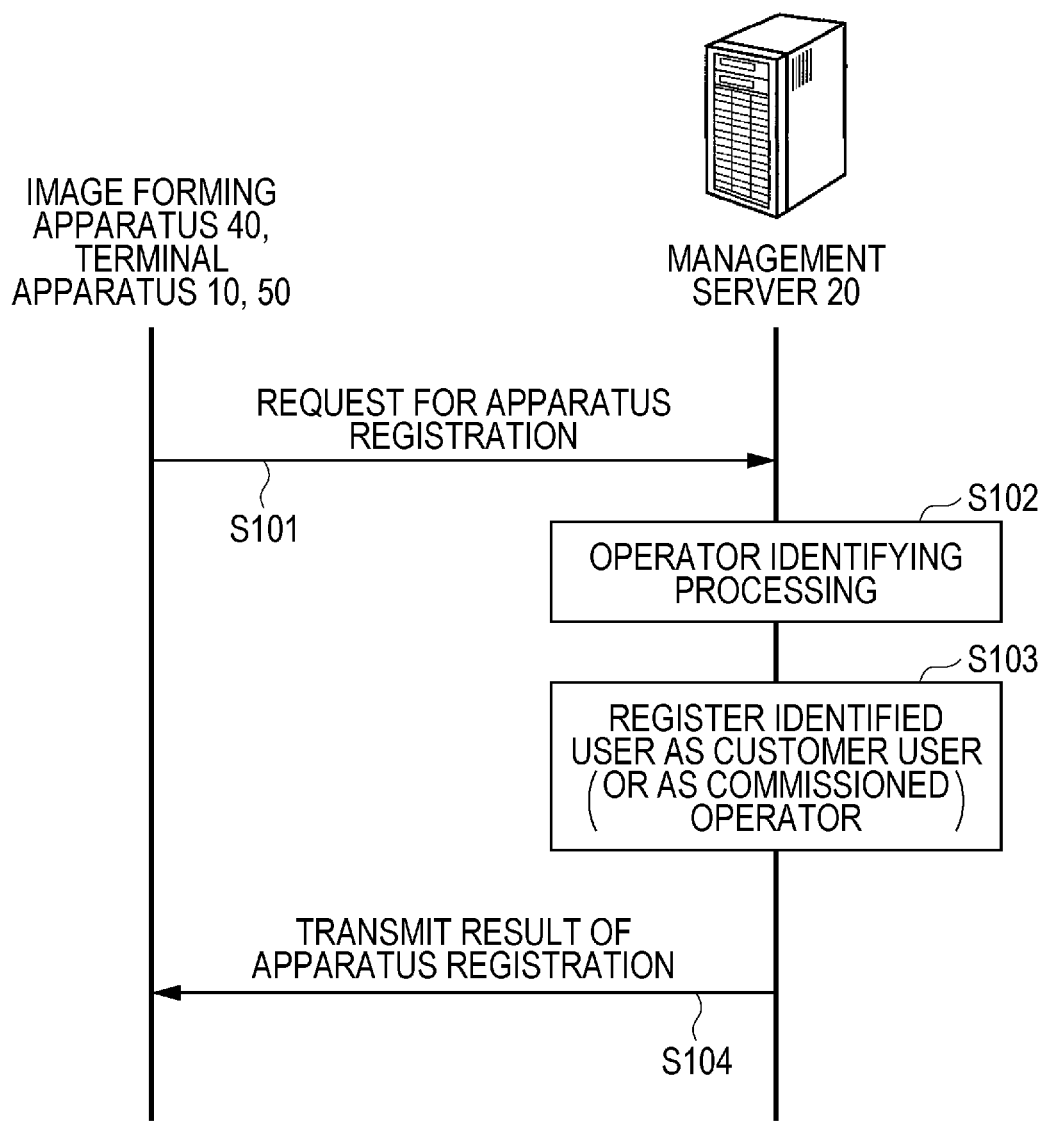
FIG. 13 is a sequence chart for explaining transmission and reception of information for registration of an apparatus.
Figure 14:
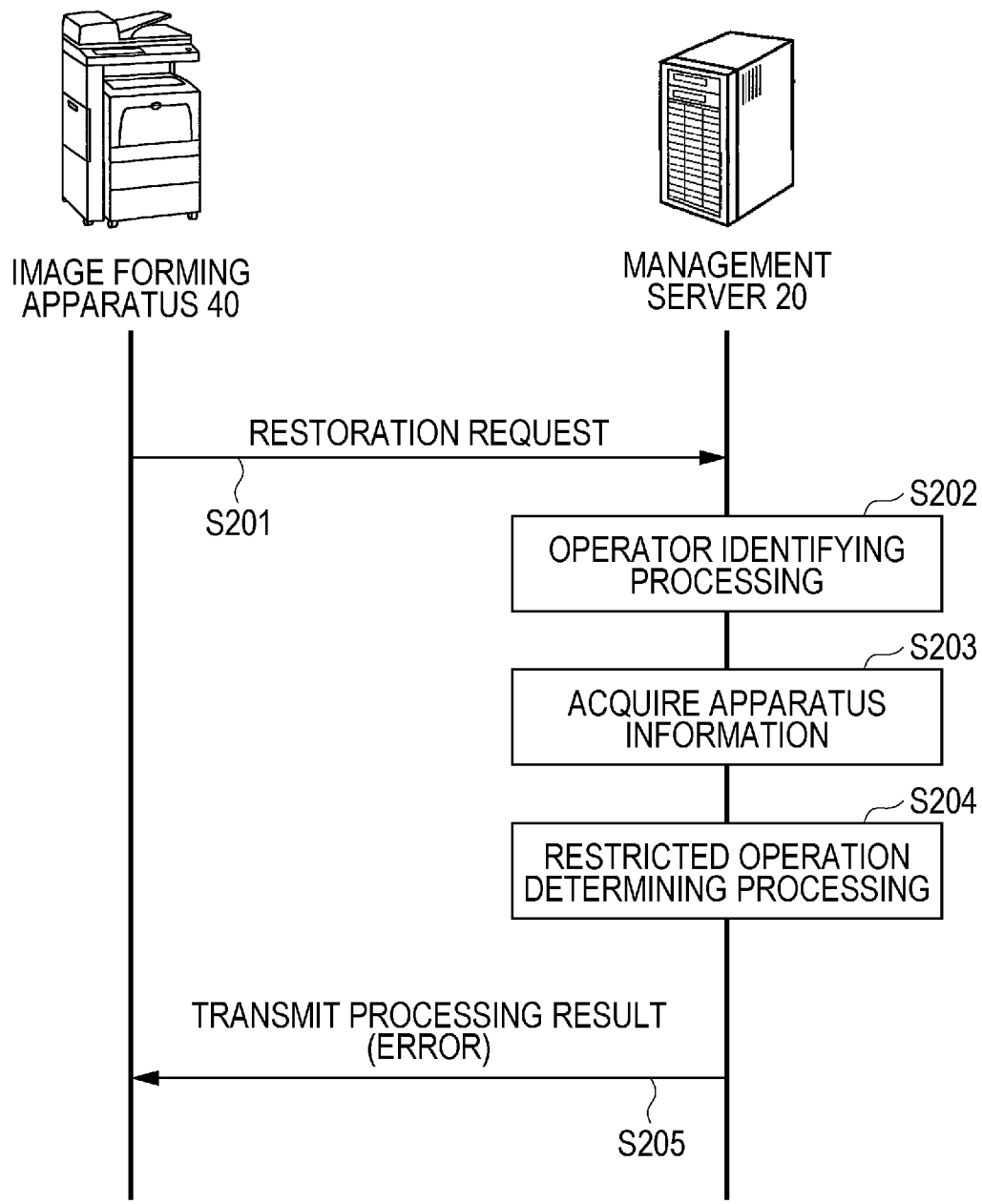
FIG. 14 is a sequence chart for explaining a case where an error is returned in response to a restoration request to the management server.

Next, transmission and reception of information between (i) the management server 20 and (ii) the image forming apparatus 40 and the terminal apparatuses 10 and 50 is described with reference to the sequence charts of FIGS. 13 to 15.

First, transmission and reception of information for registration of an apparatus is described with reference to the sequence chart of FIG. 13.

First, in step S101, a user makes a request for apparatus registration to the management server 20 by using the image forming apparatus 40 or by using the terminal apparatus 10 or 50. In step S102, in response to the request, the management server 20 executes operator identifying processing for identifying the user who made the request for apparatus registration. Since authentication is needed to log into the management server 20, a user who performs processing on the management server 20 can be easily identified.

In step S103, the management server 20 registers the identified user in the apparatus information management table as a customer user or a commissioned operator.

Finally, in step S104, the management server 20 transmits a result of the apparatus registration to the user.

Next, a case where an error is returned in response to a restoration request to the management server 20 is described with reference to the sequence chart of FIG. 14. FIG. 14 illustrates a case where a restoration operation is performed on the operation panel of the image forming apparatus 40.

First, in step S201, a user makes a restoration request designating backup data to the management server 20 by using the image forming apparatus 40.

In response to this request, the management server 20 identifies the operator in step S202 and acquires apparatus information of an apparatus to be restored from the apparatus information management table in step S203. Specifically, the controller 23 of the management server 20 grasps that the operator is a customer user given a tenant ID "A00002" and grasps from the apparatus information management table illustrated in FIG. 4 that the customer tenant ID "A00002" and a commissioned tenant ID "B00002" are registered in association with an apparatus given an apparatus ID "10003".

Furthermore, in step S204, the controller 23 of the management server 20 acquires restriction information on the apparatus given the apparatus ID "10003" from the restricted operation information management table. In this example, the acquired restriction information on the apparatus given the apparatus ID "10003" indicates that a commissioned operator is given a priority in all operation types.

Accordingly, the controller 23 determines that an operation of the commissioned operator is given a priority over an operation of the customer user since the commissioned operator is registered in association with the apparatus given the apparatus ID "10003" and transmits, as an error notification, a processing result indicating that the restoration request from the customer user is not accepted to the image forming apparatus 40 in step S205.

That is, the controller 23 performs control so that a restoration operation of the customer user is not accepted on the basis of registration of a commissioned operator in the apparatus information management table irrespective of whether or not the commissioned operator is currently performing a restoration operation.

Next, a case where a restoration request to the management server 20 is successfully accepted is described with reference to the sequence chart of FIG. 15. In FIG. 15, a CE performs a restoration operation by using the terminal apparatus 50.

First, in step S301, a user makes a restoration request designating backup data to the management server 20 by using the terminal apparatus 50.

In response to this restoration request, the management server 20 identifies the operator in step S302 and acquires apparatus information of an apparatus to be restored from the apparatus information management table in step S303. Specifically, the controller 23 of the management server 20 grasps that the operator is a commissioned operator given a tenant ID "B00002" and grasps from the apparatus information management table illustrated in FIG. 4 that the customer tenant ID "A00002" and the commissioned tenant ID "B00002" are registered in association with the apparatus given the apparatus ID "10003".

Furthermore, in step S304, the controller 23 of the management server 20 acquires restriction information on the apparatus given the apparatus ID "10003" from the restricted operation information management table. In this example, the acquired restriction information on the apparatus given the apparatus ID "10003" indicates that an operation of the commissioned operator is given a priority in all operation types.

Accordingly, in step S305, the controller 23 accepts the restoration request from the commissioned operator and executes restoration processing by transmitting the selected backup data to the image forming apparatus 40.

Then, in step S306, the controller 23 transmits a processing result indicating that the restoration processing has been successfully completed to the terminal apparatus 50.

Modification

Although a case where a customer user commissions another user such as a CE to restore data of the image forming apparatus 40 has been described in the above exemplary embodiment, the present disclosure is not limited to this. The present disclosure is applicable as long as a user who has an authority to operate an apparatus commissions another user to operate the apparatus.

In the embodiment above, the term "processor" refers to hardware in a broad sense. Examples of the processor includes general processors (e.g., CPU: Central Processing Unit), dedicated processors (e.g., GPU: Graphics Processing Unit, ASIC: Application Integrated Circuit, FPGA: Field Programmable Gate Array, and programmable logic device).

In the embodiment above, the term "processor" is broad enough to encompass one processor or plural processors in collaboration which are located physically apart from each other but may work cooperatively. The order of operations of the processor is not limited to one described in the embodiment above, and may be changed.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
a memory; and
a processor configured to cause information indicating that a first user who has an authority to operate an apparatus is prohibited from operating the apparatus to be displayed on an operation screen of the first user in a case where the first user has commissioned a second user to operate the apparatus but attempts to operate the apparatus by himself or herself, wherein:
the commissioning by the first user to the second user includes a request to the second user to perform an operation of the apparatus instead of the first user, and the operation is a setting process performed by using a stored setting information of the apparatus,
the first user is prohibited from operating the apparatus in immediate response to the first user commissioning the second user, and until the operation is completed, and
when the operation is completed, an ID of the second user is deleted from the apparatus and the second user is not able to access the apparatus.

2. The information processing apparatus according to claim 1, wherein
the processor causes information indicating that the first user is prohibited from operating the apparatus because the second user has been commissioned to operate the apparatus to be displayed on the operation screen of the first user in a case where the first user attempts to operate the apparatus.

3. The information processing apparatus according to claim 2, wherein
the memory registers therein information on an operator and a commissioned operator in association with each apparatus; and
the processor causes the information indicating that the first user is prohibited from operating the apparatus to be displayed on the operation screen of the first user in a case where information on a commissioned operator is registered in association the apparatus which the first user attempts to operate.

4. The information processing apparatus according to claim 1, wherein the processor causes information indicating that the first user is prohibited from operating the apparatus because the second user is operating the apparatus to be displayed on the operation screen of the first user in a case where the first user attempts to operate the apparatus.

5. The information processing apparatus according to claim 4, wherein
the processor causes the information indicating that the first user is prohibited from operating the apparatus because the second user is operating the apparatus to be displayed on the operation screen of the first user in a case where there is a history of an operation of the second user within a preset period from the attempt of the first user to operate the apparatus.

6. The information processing apparatus according to claim 1, wherein
the processor causes the information indicating that the first user is prohibited from operating the apparatus to be displayed on the operation screen of the first user in a case where the first user attempts to store data into the apparatus.

7. The information processing apparatus according to claim 6, wherein
the processor causes the information indicating that the first user is prohibited from operating the apparatus to be displayed on the operation screen of the first user in a case where the first user attempts to restore setting information of the apparatus from stored setting information.

8. A non-transitory computer readable medium storing a program causing a computer to execute a process for information processing, the process comprising causing information indicating that a first user who has an authority to operate an apparatus is prohibited from operating the apparatus to be displayed on an operation screen of the first user in a case where the first user has commissioned a second user to operate the apparatus but attempts to operate the apparatus by himself or herself, wherein:
the commissioning by the first user to the second user includes a request to the second user to perform an operation of the apparatus instead of the first user, and the operation is a setting process performed by using a stored setting information of the apparatus,
the first user is prohibited from operating the apparatus in immediate response to the first user commissioning the second user, and until the operation is completed, and
when the operation is completed, an ID of the second user is deleted from the apparatus and the second user is not able to access the apparatus.

9. An information processing apparatus comprising:
memory means; and
processing means for causing information indicating that a first user who has an authority to operate an apparatus is prohibited from operating the apparatus to be displayed on an operation screen of the first user in a case where the first user has commissioned a second user to operate the apparatus but attempts to operate the apparatus by himself or herself, wherein:
the commissioning by the first user to the second user includes a request to the second user to perform an operation of the apparatus instead of the first user, and the operation is a setting process performed by using a stored setting information of the apparatus,
the first user is prohibited from operating the apparatus in immediate response to the first user commissioning the second user, and until the operation is completed, and
when the operation is completed, an ID of the second user is deleted from the apparatus and the second user is not able to access the apparatus.

* * * * *